April 21, 1953 — L. M. PERSONS — 2,635,638
FLUID CONTROL VALVE
Filed Dec. 29, 1947 — 3 Sheets-Sheet 1

INVENTOR
LAWRENCE M. PERSONS
BY
Rey Eilers
ATTORNEY

INVENTOR
LAWRENCE M. PERSONS
BY
Rey Eilers
ATTORNEY

April 21, 1953 L. M. PERSONS 2,635,638
FLUID CONTROL VALVE
Filed Dec. 29, 1947 3 Sheets-Sheet 3

INVENTOR
LAWRENCE M. PERSONS
BY
Rey Eilers
ATTORNEY

Patented Apr. 21, 1953

2,635,638

UNITED STATES PATENT OFFICE 2,635,638

FLUID CONTROL VALVE

Lawrence M. Persons, Chesterfield, Mo., assignor to McQuay-Norris Manufacturing Company, St. Louis, Mo., a corporation of Delaware Application December 29, 1947, Serial No. 794,393

15 Claims. (Cl. 137—700)

This invention relates to improvements in control devices. More particularly this invention relates to improvements in control devices that can be used to regulate the flow of fluid materials.

It is therefore an object of the present invention to provide an improved control device that can be used to regulate the flow of fluid materials.

In the operation of devices wherein fluid materials are selectively caused to flow or are held against movement by a valve, it is sometimes desirable to place the valve at a distance from the actuator for the valve. In those instances, an operating connection must be provided between the valve and the actuator therefor; and that connection should be sturdy, simple and inexpensive. That connection is usually electrical or mechanical in character; the electrical connection utilizing a switch-actuated solenoid, and the mechanical connection utilizing two levers and an intermediate link. Control systems of this type are workable but they are usually subject to the objection that the control of the valve is exclusively electrical or is exclusively mechanical in character. The present invention obviates this objection by providing a control device wherein the valve is located at a distance from the actuator for the valve, and wherein both electrical and mechanical actuation are provided for the valve. Such an arrangement enables the control device to have the advantages of both mechanical and electrical actuation. It is therefore an object of the present invention to provide a control device wherein the valve is located at a distance from the actuator for the valve, and wherein both electrical and mechanical actuation are provided for the valve.

The mechanical and electrical connections for the valve of the present invention are selectively operable to actuate that valve, and they are also interrelated so the manual connection can be used to open the valve and so the electrical connection can thereafter be used to close the valve. This arrangement makes it possible to open the valve by using the manual connection, and to close that valve after a predetermined time by a clock-operated switch in the electrical connection. This enables the user of the control device to pre-set that device and attain scheduled closing of the valve without requiring further attention from the user. For example, where the control device is used to actuate the valve of the oven in a stove, the cook can place the food in the oven, open the valve by using the manual connection, and then use a clock-actuated switch in the electrical connection to close the valve after a predetermined time. It is therefore an object of the present invention to provide a control device wherein the mechanical and electrical connections for the valve are interrelated.

The mechanical connection in the control device of the present invention can utilize a sheathed flexible cable. That cable will extend between the valve and the actuator for the valve; and it will move relative to its sheath to operate the valve. Sheathed cables of this type have considerable frictional resistance, but the control device of the present invention minimizes the effect of this resistance by providing a spring that assists movement of the cable relative to the sheath. A stop is provided to limit the action of the spring so the spring can assist movement of the cable but will not accidentally close the valve. It is therefore an object of the present invention to provide a control device wherein a spring is used to assist movement of the cable, but wherein a stop limits the action of the spring.

The actuator of the control device of the present invention has a handle which is rotatable to close or open the valve. This handle can be set in "on" and "off" positions, and it is free to move to the position which corresponds to the position occupied by the valve. By being free to move, the handle can be moved to the "off" position by the inertia of the valve as it moves to closed position. As a result, the handle can act as an indicator to show the condition of the valve.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

Referring to the drawing in detail, the numeral 10 denotes a valve housing which is provided with a threaded inlet 12 and a threaded outlet 14. The housing 10 is preferably formed by casting, and the threaded inlet 12 and the threaded outlet 14 are preferably machined in the casting. The inlet 12 can receive a threaded pipe, as for example a section of a gas line; and the threaded outlet 14 also can receive a threaded pipe. A valve seat 16 is provided in the valve housing 10, and that seat is intermediate the inlet 12 and outlet 14. A movable valve element 18 is provided; and when that valve element is spaced from the valve seat 16, gas can flow through the housing 10 from the inlet 12 to the outlet 14. However, when the valve element 18 engages valve seat 16, no gas can flow through housing 10.

The valve housing 10 will ordinarily be disposed between the jets of a stove and the inlet pipe of that stove; and where that is the case, movement of the valve element 18 away from the valve seat 16 will permit gas to flow to the jets of the stove. A thermally responsive device will usually be interposed in the gas line between the jets of the stove and the intake of the stove; and that thermally responsive device will control the rate of flow. With this arrangement, the thermally responsive device can be set to provide any desired temperature, and the movable valve element 18 in valve housing 10 will determine when the gas is turned "on" and "off."

The valve element 18 is provided with a vertically disposed stem 20, and that stem is integrally secured to the valve element 18. As a result, movement of the valve stem 20 will cause concomitant movement of the valve element 18. The valve stem 20 has a shoulder 22 thereon, and the upper edge of that shoulder receives the lower end of a helical spring 24 which is tightly wound around the upper end of the valve stem 20. The upper end of the helical spring 24 bears against a shoulder on the core 26 of an electro-magnet or solenoid. The lower end of the electro-magnetic core 26 and the upper part of the valve stem 20 are surrounded by a movable sleeve 28 of magnetic material. The inner surface of the sleeve 28 bears against and is guided by the face of the shoulder 22 on valve stem 20, and the small diameter, lower portion of sleeve 28 can bear against the bottom of shoulder 22. The engagement between the small diameter lower portion of sleeve 28 and the shoulder 22 of valve stem 20 enables upward movement of the sleeve 28 to cause upward movement of the valve stem 20. While the inner surface of sleeve 28 does bear against the outer face of shoulder 22 on valve stem 20, the sleeve 28 can readily move relative to the shoulder 22; and the sleeve 28 will normally move downwardly until the small diameter lower portion of that sleeve is spaced below the shoulder 22. With this arrangement, a lost motion action is provided between the sleeve 28 and the valve stem 20; and this lost motion action permits momentary upward movement of the sleeve 28, in response to magnetic lines of force from the electro-magnetic core 26, before the small diameter lower portion of the sleeve 28 strikes the shoulder 22 on valve stem 20. Although this movement is only momentary, it permits the sleeve 28 to develop some momentum; and that momentum facilitates prompt upward movement of valve stem 20. This makes it possible to attain prompt actuation of the valve stem 20 with a small electromagnet or solenoid.

A flange 30 is provided on the lower end of the sleeve 28; and that flange can bear against the upper surface of the valve element 18, thus limiting downward movement of the sleeve 28 relative to the valve stem 20. The weight of the sleeve 28 and the flange 30 will be carried by the valve element 18; and that weight will tend to hold the valve element 18 in engagement with the valve seat 16. The core 26 of the electromagnet or solenoid is provided with a gas-tight shield 32 which extends downwardly between the movable sleeve 28 and the fixed electromagnet or solenoid winding 38. This gas-tight shield extends through an opening in a closure plate 34, and the end of the shield 32 is secured to that closure plate in a gastight seal, as by soldering, brazing, or other means. The closure plate 34 rests upon a gasket 36 which in turn rests upon an opening in the top of the valve housing 10; the gasket 36 providing a gas-tight seal between the closure plate 34 and the valve housing 10, and the closure plate 34, the gas-tight shield 32, and the electromagnet or solenoid core 26 providing a gas-tight enclosure. With this construction, no gas can escape from the upper portion of the valve housing 10 although the valve stem 20 extends upwardly through that upper portion. This makes it possible to actuate the valve stem 20 electrically without permitting loss of gas.

Three spaced protuberances 35 are formed on the under side of closure plate 34, and those protuberances limit upward movement of the sleeve 28 and the flange 30 attached thereto. The protuberances 35 are so spaced that they hold the sleeve 28 in coaxial relation with the core 26, and they provide three point, chatter-free support for the flange 30 and sleeve 28. This assures quiet operation of the valve when it is actuated by the solenoid winding 38.

The electromagnet or solenoid coil 38 of the control device is housed within a casing 40 which extends upwardly from the closure plate 34. This casing has an opening 41 in one side thereof to accommodate the leads from the electromagnet or solenoid winding 38, and it has a cover plate 42. There is no need of providing and maintaining a gas-tight engagement between the leads of the winding 38 and the casing 40, nor is there any need of providing and maintaining a gas-tight engagement between the cover 42 and the casing 40, because the casing 40 is completely isolated from the gas in the housing 10 by means of the closure plate 34 and the gas-tight shield 32.

An opening is provided in the bottom of the valve housing 10 to accommodate the lower end of the valve stem 20; and that opening communicates with a cam housing 44. Cam housing 44 is secured to the bottom of the valve housing 10 by means of bolts or screws, not shown, which extend through openings 48 in a flange at the upper end of housing 44. A gasket 46 is positioned between the flange of the cam housing 44 and the bottom of the valve housing 10, thus providing a gas-tight connection between the cam housing 44 and the bottom of the valve housing 10. An opening 50 is provided in one side of the housing 44, and that opening receives the cam shaft 52 which is partially within and partially without the cam housing 44. One end of the shaft 52 is supported in the opening 50, and the other end of the shaft 52 is supported in a recess which is formed in the wall of cam housing 44 that is opposite to the opening 50. The cam shaft 52 has a hexagonal head 54, and that head fits into a hexagonal recess in a crank arm 56. The crank arm 56 is assembled with shaft 52 by slipping the crank arm over the small end of the shaft 52, and then moving the crank arm 56 into engagement with the head 54 of the shaft 52. Thereafter, the hexagonal recess in the crank arm 56 and the hexagonal head 54 of the shaft 52 are placed in register with each other and the head 54 is seated in the hexagonal recess. The engagement between the hexagonal head 54 of shaft 52 and the hexagonal recess of the crank arm 56 assures conjoint rotation of the crank arm 56 and the cam shaft 52.

A pin 58 is carried by the inner end of the cam shaft 52, and that pin extends through and projects outwardly beyond the opposite surfaces of cam shaft 52. A sleeve 60 telescopes over and is supported by the shaft 52; and that sleeve has a projecting shoulder 62 which lies in the path of the pin 58 carried by the cam shaft 52. As a result, rotation of the cam shaft 52, relative to the sleeve 60, will bring the pin 58 into engagement with one or the other of the faces of the shoulder 62 on sleeve 60. Both faces of the shoulder 62 are squared off so the pin 58 can meet the shoulder 62 and force it to move with shaft 52. However, the shoulder 62 has a length of only about ninety (90) degrees; and thus the cam shaft 52 can rotate for about seventy (70) degrees before it causes the sleeve 60 to rotate. A cam 64 is integrally secured to the sleeve 60; and it extends transversely of the shaft 52. With this construction, rotation of the cam shaft 52 will bring the pin 58 into engagement with the shoulder 62 on sleeve 60, and further rotation of cam shaft 52 will cause the sleeve 60 and the cam 64 thereon to rotate. The fact that the pin 58 can rotate for a part of a revolution without causing rotation of the sleeve 60 means that there is a lost motion connection between the shaft 52 and the cam 64 which is integrally secured to the sleeve 60. The cam 64 carries a pin 66, and that pin is in register with and extends into a slot 70 on a cam 68. The cam 68 is immediately adjacent the cam 64, but it is not secured to the cam 64 except through the engagement between pin 66 and slot 70. This engagement provides a lost motion connection between the cam 64 and the cam 68. From this it is apparent that there are two lost motion connections in the construction shown in Figs. 1–3.

Figure 2:
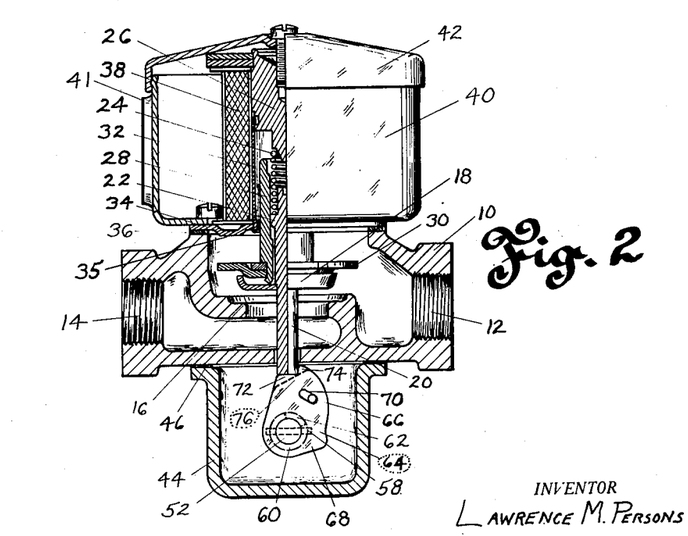
Fig. 2 is a partially sectioned view of the gas valve shown in Fig. 1, and it shows that valve in "on" position.

The upper end of the cam 68 is provided with a flat face 72 which is horizontal when the cam 68 is in locking position, as shown in Fig. 2; and the upper end of cam 68 is provided with a stop 74 that is vertical when the cam 68 is in locking position. The upper end of the cam 64 has an inclined face 76, and that inclined face extends upwardly above the level of the flat face 72 on the upper end of cam 68.

A helical spring 78 is provided within the cam housing 44, and that spring surrounds the cam shaft 52. One end of the helical spring 78 extends into an opening in the cam 68, and the other end of the spring 78 is secured to the side wall of the housing 44; as a result, the helical spring 78 tends to rotate the cam 68 in a counter-clockwise direction in Fig. 2. Such rotation of cam 68 would, if not prevented, rotate the cams 68 and 64 in a counter-clockwise direction, thus rotating the shaft 52 in a counter-clockwise direction. When the cam 68 is permitted to rotate in response to the action of spring 78, the end of slot 70 will strike pin 66 of cam 64, causing the shoulder 62 of sleeve 60 to strike pin 58 and rotate cam shaft 52.

The opening 50 in the side wall of the cam housing 44 receives the shaft 52; and that opening also receives packing 80 which surrounds the shaft 52. The packing 80 is pressed into the conical inner end of the opening 50 by a helical spring 82 which surrounds the shaft 52. This spring presses against the packing 80 and also presses against the crank arm 56, thus holding the packing 80 in sealing relation with the inner end of opening 50. The spring 82 is made so it is less powerful than the spring 78; thus the spring 78 can hold the shaft 52 against axial displacement, despite the force exerted on the crank arm 56 by spring 82. The packing 80 cooperates with the gasket 46 to maintain the gas-tight integrity of the cam housing 44.

The valve housing 10 is provided with a lug 84 that projects outwardly from the side of the housing 10. That lug has a vertically disposed opening therethrough, and it has a set screw 86 which is threadably supported in the side thereof. The lug 84 is disposed above the lug 57 on the end of crank arm 56; and the lug 84 serves as a guide and support for a sheath 88. The sheath 88 is shown as being formed of a strip of metal that is coiled to form a sheath, and such a sheath is quite workable. However, it is preferred to use a continuous thin metal sheath which is formed by extruding, drawing, or otherwise treating a piece of metal. The sheath 88 encloses a flexible cable 90, and the lower end of that cable projects beyond the lower end of the sheath 88. The lower end of cable 90 passes through an opening in the lug 57 on crank arm 56, and it is secured to that lug by a set screw 59. The upper end of the cable 90 extends outwardly from the upper end of the sheath 88; and that end of cable 90 is secured to an actuating mechanism for the gas valve.

Figure 4:
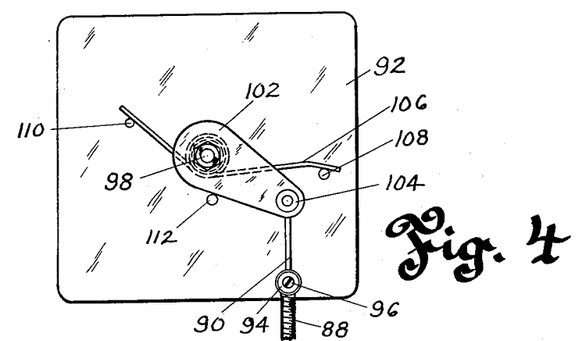
Fig. 4 is a side elevational view of the rear of the actuator shown in Fig. 1, and it shows that actuator in "off" position.
Figure 5:
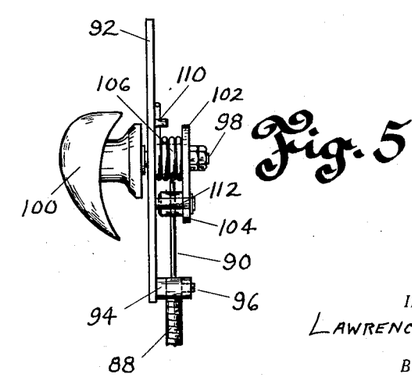
Fig. 5 is an end elevational view of the actuator shown in Figs. 1 and 4.
Figure 6:
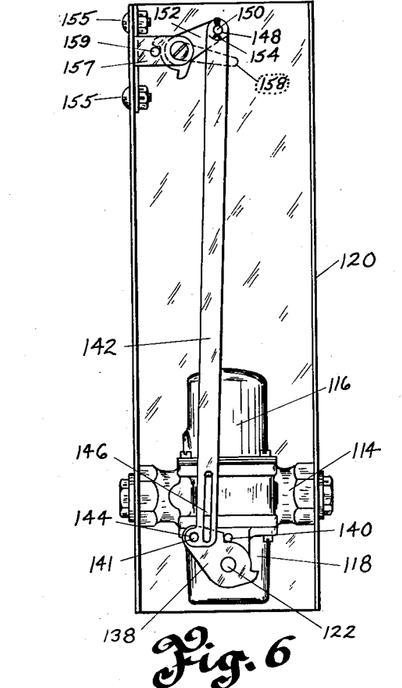
Fig. 6 is a side elevational view of another gas valve and actuating mechanism therefor which are made in accordance with the principles and teachings of the present invention, and it shows the gas valve and actuating mechanism therefor in "on" position.
Figure 7:
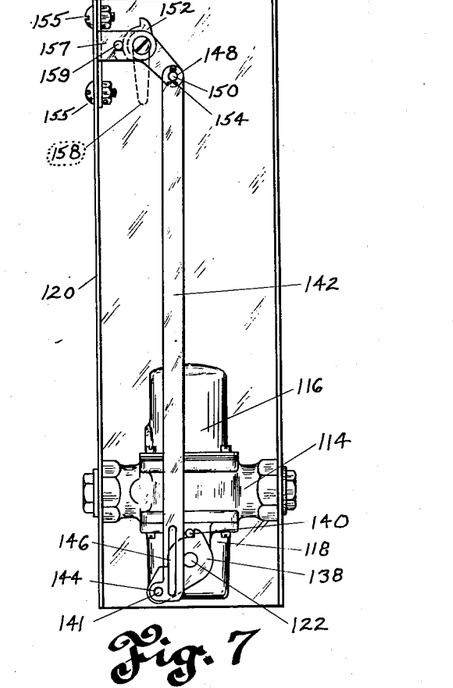
Fig. 7 is a side elevational view of the gas valve and actuating mechanism of Fig. 6, but it shows that valve and mechanism in the "off" position.
Figure 8:
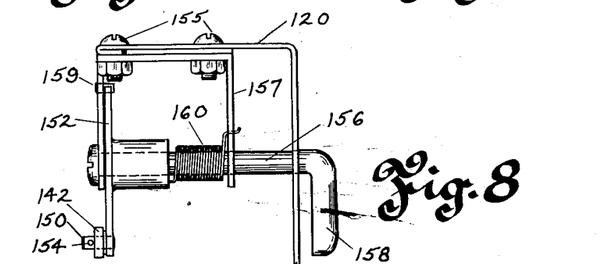
Fig. 8 is a plan view of the handle used in the actuating mechanism of Figs. 6 and 7.
Figure 9:
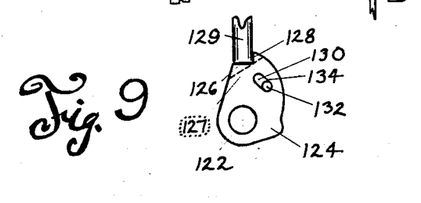
Fig. 9 is a side elevational view of the cam shaft and cams for the valve of Figs. 6 and 7.

The actuating mechanism is mounted on a supporting plate 92 which is shown to be of rectangular configuration; but, obviously, the configuration of the plate 92 is not important since it may be made of any suitable form or size. The particular form of plate 92, shown in Figs. 1, 4 and 5, was selected because it fitted the design and structure of a stove with which the valve housing 10 was to be used. The valve housing 10 was located adjacent the bottom of the stove while the supporting plate 92 was located at the top of the stove. The sheath 88 and the flexible cable 90 extended between the valve housing 10 and the supporting plate 92. A lug 94 is provided on the plate 92, and the upper end of the sheath 88 extends into a vertically disposed opening in that lug. A set screw 96 is threadably mounted in the lug 94, and it secures the upper end of the sheath 88 to the lug 94 by pressing against the side of sheath 88. The plate 92 also is provided with an opening that receives the horizontally disposed shaft 98. This shaft carries a handle 100 at its front end and it carries a crank arm 102 at its rear end. The crank arm 102 is disposed to the rear of the supporting plate 92 while the handle 100 is disposed in front of the supporting plate 92. The crank arm 102 is provided with a lug 104, and that lug receives and holds the upper end of the flexible cable 90. A helical spring 106 is wound around the shaft 98, and that spring normally presses against the lug 104 on the crank arm 102. A pin 108 is disposed adjacent one end of the spring 106 and that pin serves to limit clockwise rotation of the right hand end of spring 106; thus making it possible for the lug 104 to move out of contact with the spring 106, and also limiting the amount of rotation of arm 102 that can be caused by spring 106. A pin 110 is disposed adjacent the left hand end of helical spring 106, and that pin resists counter-clockwise rotation of that end of the spring. A pin 112 is provided adjacent the arm 102, and that pin limits clockwise rotation of the arm 102.

The operation of the control device of the present invention is simple but certain. Gas entering the threaded inlet 12 of housing 10 will press downwardly on the upper surface of the valve element 18, and that pressure will cooperate with the force exerted by spring 24 to securely hold the valve element 18 in engagement with the valve seat 16. During such periods, gas cannot pass through the valve housing 10; and no gas can flow from the outlet 14 to the jets or burners of the stove or other heating device. The valve element 18 can be forced to move away from the valve seat 16, and thus permit gas to flow from the outlet 14, by manual or electrical, or manual-electrical actuation. Purely electrical actuation of the valve stem 20 can be attained by connecting the leads, not shown, of the solenoid winding 38 to a suitable source of electricity. Current from that source will pass through the solenoid winding 38 and will create magnetic lines of force in the core 26. Those lines of force will cause the sleeve 28 to move upwardly; and as that sleeve moves upwardly its lower end will strike the shoulder 22 on the valve stem 20 and move that stem upwardly, thus raising the valve element 18. As long as the solenoid 38 is energized, the sleeve 28 and valve stem 20 will be held in such position that the valve element 18 is spaced from the valve seat 16. Discontinuance of the flow of current from the source, as by operation of a manual, time, or thermal switch, will de-energize the solenoid winding 38 and permit the spring 24 to force valve element 18 against valve seat 16.

Figure 1:
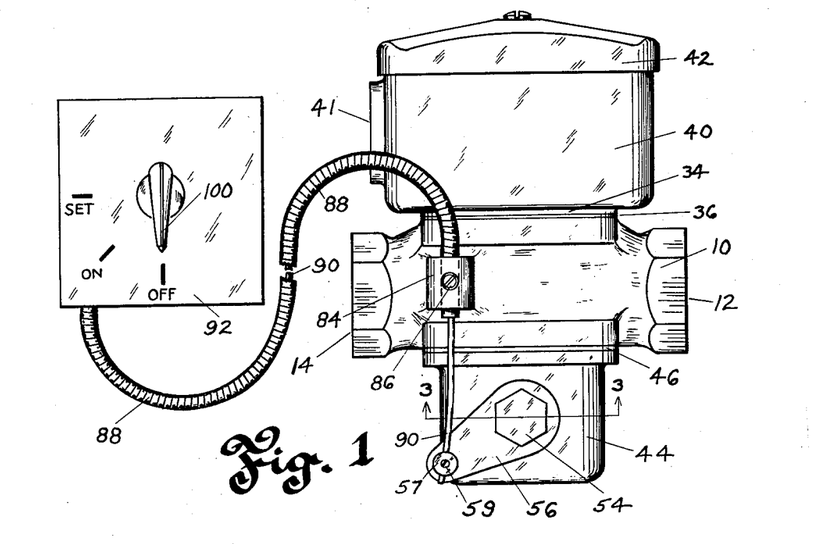
Fig. 1 is a side elevational view of a gas valve and actuating mechanism therefor which are made in accordance with the principles and teachings of the present invention, and it shows the gas valve and actuating mechanism therefor in "off" position.

Purely manual actuation of the valve stem 20 can be attained by rotating the handle 100 in a clockwise direction in Fig. 1 from "off" position to "set" position. This pulls the flexible cable 90 upwardly relative to the sheath 88; and the lower end of the cable 90 will pull the end of crank arm 56 upwardly and cause that arm to rotate in a clockwise direction. Shaft 52 will rotate with arm 56; and as the shaft 52 rotates, it will move the pin 58 thereon into engagement with the shoulder 62 on sleeve 60. This engagement between pin 58 and sleeve 60 will cause the cam 64 to rotate in a clockwise direction, and such rotation of cam 64 will cause pin 66, carried by that cam, to move to the right hand end of the slot 70 in the cam 68. Continued rotation of the shaft 52 in a clockwise direction will cause the cam 64 to move the cam 68 approximately ninety (90) degrees; the back of the cam 68 gradually raising the valve stem 20 until it passes the stop 74 and then drops down against the flat face 72 of cam 68. Thereafter, the stop 74 will extend above the lower end of valve stem 20, thus preventing rotation of the cam 68 in a counter-clockwise direction under the influence of the helical spring 78.

Once the handle 100 has been rotated to the "set" position and the cam 68 and valve stem 20 thereby locked together, the handle 100 can be released. At such time the spring 106, which was compressed as the handle 100 was being rotated to "set" position, will rotate the handle 100 toward the "on" position. The handle 100 will rotate under the action of spring 106 until the handle 100 is adjacent pin 108; and thereafter the handle 100 will be free from pressure exerted by the spring 106 since the pin 108 will hold the right hand end of spring 106 against further clockwise movement in Fig. 4. At this time the handle 100 will be at the "on" position. As the handle 100 was being moved, the cable 90 was being moved downwardly; and such movement caused counter-clockwise rotation of shaft 52. Such rotation can occur even though cam 68 is held against rotation, by the engagement between stop 74 and valve stem 20, because the lost motion action of pin 58 and shoulder 62 permits about seventy (70) degrees of lost motion.

When the spring 106 bears against the pin 108, the pin 58 will be immediately adjacent the shoulder 62 of sleeve 60. To close the valve, the handle 100 can be rotated toward the "off" position; the cable 90 rotating the shaft 52 and causing the sleeve 60 and cam 64 to rotate. The inclined face 76 of cam 64 will then raise valve stem 20 upwardly until it is above stop 74, thus freeing cam 68. Thereupon the spring 78 will rotate cams 64 and 68 to horizontal position, thus permitting spring 24 to move valve element 18 against the valve seat 16. The rotation of the cam 68, under the action of spring 78, will cause exceedingly rapid rotation of the cam 64; and that rotation will move the shoulder 62 on sleeve 60 against the pin 58 with sufficient force to rotate that shaft and pull the cable 90 downwardly. This downward pull on the cable 90 is sufficient to move the handle 100 all the way to the "off" position in case it was not manually moved all the way to that position.

To attain a combined manual-electrical actuation of the valve and the actuating mechanism therefor, the handle 100 is rotated to the "set" position and then is permitted to move back to the "on" position under the influence of the spring 106. The initial movement of handle 100 will cause cam 68 to raise valve stem 20 to open valve position and then lock it in that position. Thereafter, a time switch can be connected to the solenoid 38 of the valve; and where that switch can give a momentary impulse, it will act at the desired time to cause the solenoid winding 38 to raise and then drop the valve stem 20. Such action will lift stem 20 above the stop 74 on cam 68, thus permitting cam 68 to rotate to horizontal position; and it will then let the valve stem 20 move down into valve-closing position. The spring-induced inertia of the cam 68 will be sufficient to rotate shaft 52 and pull the cable 90 downwardly. Such action will move the handle 100 from "on" position to "off" position. In this way the handle 100 not only acts as a manipulator but also acts as an indicator for the control device.

Figure 3:
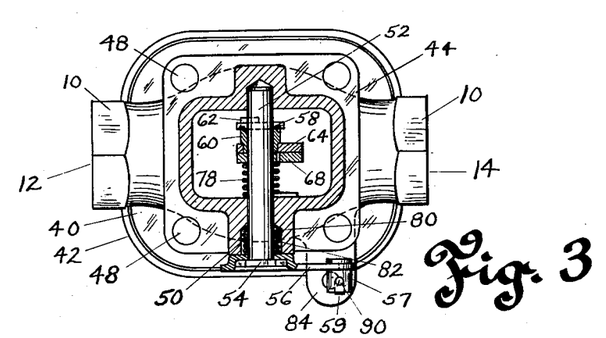
Fig. 3 is a cross sectional view of the gas valve of Figs. 1 and 2, rotated one hundred and eighty (180) degrees about a vertical axis, it is taken along the plane indicated by the line 3—3 in Fig. 1, and it shows that valve in "on" position.

A modified form of gas valve and actuating mechanism is shown in Figs. 6–9. That valve includes a housing 114 which is similar to the valve housing 10 of Figs. 1–3; and the upper portion of the housing 114 is provided with a solenoid casing 116. The casing 116 differs from the solenoid casing 40 and 42 of Figs. 1–3 in that it is unitary rather than made in two parts. The housing 116 contains a solenoid, solenoid core, and movable sleeve which act upon the valve stem which operates the valve element in housing 114. These various elements are not shown because they are identical to their corresponding elements in Figs. 1–3. A cam housing 118, which is similar to the cam housing 44 of Figs. 1–3 is secured to and supported by the under side of the valve housing 114. The valve housing 114 is supported by a frame 120; which frame may be of any suitable form and shape, the form indicated in the drawing merely being one simple but usable construction.

The cam housing 118 rotatably supports a cam shaft 122 which carries a cam 124 which is similar to cam 68; and the cam 124 is supported on but is rotatable relative to the shaft 122. The cam 124 has a horizontally disposed flat face 126 similar to the flat face 72 of cam 68 in Figs. 1–3; and it has a vertically disposed stop 128 which is similar to the stop 74 of the cam 68. Cam 124 is positioned adjacent a valve stem 129, and the stop portion 128 of that cam is disposed so it can be moved into the path of the valve stem 129. Thus, the stop 128 can engage the valve stem 129 and hold that stem in open position while holding the cam 124 against rotation. A cam 130, which is similar to cam 64 of Figs. 1–3, is positioned adjacent cam 124. The cam 130 differs from the cam 64 in that it is fixedly secured to the cam shaft 122 instead of being connected to an intermediate sleeve supported on the shaft. The cam 130 carries a pin 132 which extends into a slot 134 formed in the cam 124; and with this arrangement, the cam 130 will move with cam shaft 122 and will provide a lost motion connection between cams 124 and 130 and between shaft 122 and cam 124. Such a lost motion connection permits the cam shaft 122 to rotate and move cams 124 and 130 under the valve stem 129 and permits tripping movement of cam 130 while cam 130 is held by stop 128. As shaft 122 rotates in a clockwise direction, the gently rounded face of the cam 124 will first raise valve stem 129 and will then let it drop down into engagement with the flat face 126 of that cam. Thereafter, cam 124 will be held against rotation until the cam shaft 122 is rotated to cause the inclined face 127 of cam 130 to engage valve stem 129 and raise it out of the path of stop 128. Thereupon a spring, not shown, which is similar to the spring 78 of Fig. 3, will rotate cams 124 and 130 into the "off" position; and the valve stem 129 will be free to move the valve element into engagement with the valve seat.

A crank arm 138 is secured directly to the cam shaft 122, and it is provided with shoulders adjacent an arcuate section, which shoulders cooperate with a pin 140 to limit rotation of the crank arm 138 and cam shaft 122. A pin 141 is provided on the outer end of the crank arm 138, and that pin selectively fits into an opening 144 or a slot 146 in a connecting rod 142. The slot 146 is longer than the vertical travel of pin 141 so the rod 142 can be used to raise arm 138 into "on" position but cannot be used to move that rod to "off" position. Such an arrangement is desirable where the actuating mechanism is to be set mechanically but is to be tripped electrically. The opening 144 closely surrounds pin 141; and where it telescopes over that pin it will enable connecting rod 142 to open and close the valve. This provides full manual operation of the valve, and it can cooperate with the solenoid in housing 116 to provide manual opening and electrical closing of the valve.

An opening 148 is provided at the top of the connecting rod 142, and that opening fits over a pin 150 on a crank arm 152. The arm 152 is held in assembled relation with the rod 142 by a cotter pin 154 that is passed through an opening in the pin 150 and is then expanded to prevent its withdrawal. The hub of the arm 152 is secured to a shaft 156 by a set screw, not shown; and the arm 152 will be moved by the shaft 156. Shaft 156 is rotatably supported by a U-shaped bracket 157 which is secured to the frame 120, as by bolts and nuts 155. A handle 158 is provided on the end of the shaft 156 to facilitate rotation of that shaft. A spring 160 is secured to the hub of arm 152 and to the U-shaped bracket 157, and that spring tends to rotate the handle 158 into the "on" position. This spring assists the spring, not shown, adjacent cam shaft 122 in rotating shaft 122 to valve closing position. A stop pin 159 is provided adjacent the crank arm 152, and it cooperates with two shoulders on that crank arm to limit rotation of the crank arm 152.

With this modified construction, it is possible to attain either full or partial manual operation of the valve. Where partial manual operation is desired, the slot 146 will be telescoped over the pin 141; and where full manual operation is desired, the opening 144 will be telescoped over pin 141. In either case, handle 158 can be rotated to open the valve, and the solenoid in the housing 116 can close or open the valve. By providing the opening 144 and the slot 146 in the connecting rod 142, the present invention makes it possible to build a standard unit which can be used in two different ways merely by shifting the rod 142 relative to the pin 141. Of course, where desired, either the slot 146 or the opening 144 can be omitted.

Whereas a preferred embodiment of the present invention has been shown and described in the drawing and accompanying description it should be obvious to those skilled in the art that various changes may be made in the form of the invention without affecting the scope thereof.

What I claim is:

1. A fluid controlling device that comprises a housing, an inlet and an outlet for said housing, a valve seat intermediate said inlet and outlet, a valve element that is movable toward and away from said valve seat to selectively prevent or permit flow of fluids through said housing, a stem secured to said valve element, a pair of cams disposed adjacent said stem, one of said cams having a locking portion to engage the said stem and thereby hold said valve element away from said seat and having an actuating portion to engage said stem and move said stem away from said seat, another of said cams having a tripping portion for engaging said stem, a lost-motion connection between said cams whereby said tripping cam can be moved relative to said locking cam to place said tripping portion of said tripping cam in engagement with the stem and raise the stem out of engagement with said locking cam, a rotatable shaft upon which said cams are mounted, said shaft being fixed relative to said housing but being rotatable to move said tripping cam, a lost-motion connection between said tripping cam and said shaft, a manually operable handle to rotate said shaft, and an electromagnetic element to cause selective movement of said stem, said stem selectively engaging said locking portion of the said one cam to hold the said one cam in open valve position and being selectively movable out of engagement with said locking portion by said tripping cam or by said electromagnetic element to free the said one cam for movement to closed valve position, said manually operable handle acting as an indicator, said handle being movable to rotate said shaft and move said tripping cam until the lost-motion connection between said cams initially forces the actuating portion of said locking cam to engage said stem and move said valve element away from said seat and secondarily forces said locking portion of said locking cam into engagement with said stem to hold said valve element away from said seat, said electromagnetic element being energizable to move said stem out of engagement with said locking cam and thereby free said locking cam and said shaft for movement.

2. A fluid controlling device that comprises a housing, an inlet and an outlet for said housing, a valve seat intermediate said inlet and outlet, a valve element that is movable toward and away from said valve seat to prevent and permit flow of fluids through said housing, a pair of cams, one of said cams being adapted to move said valve element away from said valve seat and to hold said valve element away from said valve seat, a resilient element biasing said one cam to closed valve position, another of said cams being adapted to free said valve element from said one cam and thus permit said one cam and said valve element to move to closed position, a lost-motion connection between said cams, a rotatable shaft upon which said cams are mounted, said shaft being fixed relative to said housing, and a lost-motion connection between said shaft and said other cam.

3. A fluid controlling device that comprises a housing, a valve seat in said housing, a valve element that is within said housing and is movable toward and away from said valve seat to prevent and permit flow of fluids through said housing, said valve element being biased toward said valve seat, a cam, a support for said cam that is fixed relative to said housing and that holds said cam adjacent said valve element, said cam being movable to engage said valve element and hold it away from said valve seat, said cam being biased out of engagement with said valve element, a second cam that is adjacent said first cam and is selectively movable to free said first cam from said valve element and permit said valve element to move toward said valve seat, a lost-motion connection between said cams, an actuator that moves said second cam directly and moves said first cam through said lost-motion connection between said cams, and an electromagnetic element, said valve element selectively engaging the first said cam to hold said first cam against movement, said electromagnetic element and said second cam selectively acting upon said valve element to disengage that element from said first cam and permit said valve element to move toward said valve seat.

4. A fluid controlling device that comprises a valve housing, a valve seat within said housing, a valve element within said housing that is movable toward and away from said valve seat to selectively prevent or permit flow of fluids past said valve seat, a manually operable actuating mechanism that can move said valve element away from said valve seat and that has a locking portion thereon to selectively hold said valve element away from said valve seat, said mechanically operable actuating mechanism being biased away from said valve element, an electrically operable mechanism that can move said valve element away from said valve seat, said valve element having a stem that is selectively acted upon by said manually operable and said electrically operable mechanisms to move said valve element relative to said valve seat, a tripping cam to move said stem, a handle remote from said housing, and a mechanical connection extending between said handle and said mechanically operable mechanism to operate said tripping cam, movement of said stem by said tripping cam and by said electrically operable mechanism being adapted to free said mechanically operable mechanism for movement away from said valve element.

5. A fluid controlling device that comprises a housing, an inlet and an outlet for said housing, a valve seat intermediate said inlet and outlet, a valve element within said housing that is movable toward and away from said valve seat to selectively prevent or permit flow of fluids through said housing, a cam, an actuator for said cam, a support that is fixed relative to said housing and that holds said cam in register with, and for rotation relative to, said valve element, said cam being rotatable to move said valve element relative to said valve seat and being adapted to releasably hold said valve element away from said valve seat, a resilient element biasing said cam to closed position, a tripping cam adjacent said first cam that is actuable to move said valve element and free said first cam for movement to closed position of said valve element, and an electromagnetic winding that is energizable to move said valve element and release said valve element from said first cam and free said first cam for movement to closed position of said valve element, said valve element selectively holding said first cam against movement until said valve element is moved by said tripping cam or by said electromagnetic winding.

6. A fluid controlling device which comprises a valve housing that contains a valve seat, a valve element that is movable toward and away from said valve seat to prevent and permit flow of fluid past said seat, a stem secured to and movable with said valve element, said stem being confined for axial reciprocating movement, a cam, a support for said cam that is fixed relative to said housing and that holds said cam adjacent said stem, said cam being movable to engage rotatably said stem and thereby move said valve element relative to said valve seat and to releasably engage said stem and thereby releasably hold said valve element away from said seat, a resilient element biasing said cam to valve closing position, said valve stem selectively holding said cam against movement to valve closing position, a manually-operable tripping element selectively engageable with said stem to free said cam from said stem, said tripping element being movable out of engagement with said stem whenever said cam moves to valve closing position, and an electromagnetic winding energizable to cause movement of said stem, said tripping element and said electromagnetic winding being selectively operable to cause movement of said stem and thereby permit rotation of said cam and movement of said valve element, said tripping element being moved out of engagement with said stem when said electromagnetic winding frees said cam for rotation.

7. A fluid controlling device which comprises a valve housing that contains a valve seat, a valve element that is movable toward and away from said valve seat to prevent and permit flow of fluid past said seat, a cam, a support for said cam that is fixed relative to said housing and that holds said cam adjacent said valve element, said cam being to move said valve element relative to said valve seat and to releasably hold said valve element away from said seat, a resilient element biasing said cam to valve closing position, said valve stem selectively holding said cam against movement to valve closing position, a manually-operable tripping element to free said cam for movement to valve closing position, said tripping element being movable out of tripping position whenever said cam moves to valve closing position, and an electromagnetic winding, said tripping element and said electromagnetic winding being selectively operable to act upon said valve element and permit rotation of said cam and movement of said valve element, said manually operable tripping element being spaced from said valve housing but being connected to said valve element by a flexible cable, said tripping element being movable out of tripping position when said electromagnetic winding permits rotation of said cam.

8. A fluid controlling device that comprises a housing, an inlet and an outlet for said housing, a valve seat intermediate said inlet and outlet, a valve element that is movable toward and away from said valve seat to prevent and permit flow of fluids through said housing, a pair of cams, one of said cams being adapted to move said valve element away from said valve seat and to hold said valve element away from said valve seat, a resilient element biasing said one cam to closed valve position, another of said cams being adapted to free said valve element from said one cam and thus permit said one cam and said valve element to move to closed position, a lost-motion connection between said cams, a rotatable shaft upon which said cams are mounted, said shaft being fixed relative to said housing but being rotatable to move said freeing cam, and a lost-motion connection between said shaft and said other cam, and a remotely located actuator which is movable in response to movement of said shaft.

9. In a control device which has a valve seat, a valve element movable relative to said valve seat, an actuator that is adapted to move said valve element, a second actuator that is adapted to free said first actuator from said valve element, a support that is fixed relative to said seat and that holds said actuators in register with said valve element and permits said actuators to move relative to said valve element, and a handle, the improvement which comprises a lost-motion connection between said handle and said actuator, and a lost-motion connection between said actuators.

10. In a control device which has a valve seat, a valve element movable relative to said valve seat, a plurality of actuators that are adapted to move said valve element, a shaft that is fixed relative to said seat and is movable to move said actuators and thereby move said valve element, and a handle movable to "on" position and "off" position, the improvement which comprises a remotely positioned handle, a flexible cable extending between said handle and said shaft, and a resilient element adjacent said handle that biases said handle to "off" position.

11. In a control device which has a valve seat, a valve element movable relative to said valve seat, an actuator that is adapted to move said valve element, and a handle movable to "on" position and "off" position, the improvement which comprises a remotely positioned handle, a flexible cable extending between said handle and said actuator, and a resilient element that biases said handle to "off" position, and a stop that frees said handle from the action of said resilient element at a point adjacent the "off" position.

12. A fluid controlling device that comprises a housing, an inlet and an outlet for said housing, a valve seat intermediate said inlet and outlet, a valve element within said housing that is movable toward and away from said valve seat to selectively prevent or permit flow of fluid through said housing, a pair of cams, a shaft that is fixed relative to said housing, said cams being mounted on said shaft for rotation about the axis of said shaft, one of said cams being adapted to rotate and move said valve element away from said valve seat and to hold said valve element away from said valve seat, a resilient element biasing said one cam for rotation to closed valve position, the other of said cams being adapted to rotate to free said valve element from said one cam and thus permit said one cam and said valve element to move to closed position, and an actuator to rotate said cams and selectively cause movement of said valve element toward and away from said seat.

13. A fluid controlling device that comprises a housing, an inlet and an outlet for said housing, a valve seat intermediate said inlet and outlet, a valve element within said housing that is movable toward and away from said valve seat to selectively prevent or permit flow of fluid through said housing, a pair of cams, a shaft that is fixed relative to said housing, said cams being mounted on said shaft for rotation about the axis of said shaft, one of said cams being adapted to rotate and move said valve element away from said valve seat and to hold said valve element away from said valve seat, a resilient element biasing said one cam for rotation to closed valve position, the other of said cams being adapted to rotate to free said valve element from said one cam and thus permit said one cam and said valve element to move to closed valve position, an actuator to rotate said cams and selectively cause movement of said valve element toward and away from said seat, said actuator being a handle that is rotatably mounted, and a mechanical connection extending between said handle and said shaft to transmit rotative motion from said handle to said shaft and cams.

14. In a control device which has a valve seat, a valve element movable relative to said valve seat to prevent or permit fluid flow past said seat, an actuator that is adapted to move said valve element, a handle, said handle being movable from "on" position to "off" position, and a lost-motion connection between said handle and said actuator, the improvement which comprises a spring that biases said handle to a point adjacent the "off" position thereof, and the dimensioning of said lost-motion connection so movement of said actuator to closed valve position will cause said lost-motion connection to impart a force to said handle that will move said handle to "off" position, whereby said handle indicates the condition of said control device.

15. A fluid controlling device that comprises a valve housing, a valve seat within said housing, a valve element that is movable toward and away from said valve seat to selectively prevent or permit flow of fluids past said valve seat, a manually operable actuating cam that can move said valve element away from said valve seat but is biased for movement away from said valve element, a tripping cam adjacent said manually operable actuating cam, a shaft supporting each of said cams, said cams being rotatable about the axis of said shaft, said tripping cam being selectively movable to free said manually operable actuating cam from said valve element, and an electrically operable mechanism that can move said valve element away from said valve seat and can free said manually operable actuating cam from said valve element.

LAWRENCE M. PERSONS.

References Cited in the file of this patent
UNITED STATES PATENTS

| Number | Name | Date |
|---|---|---|
| 908,278 | Koch | Dec. 29, 1908 |
| 1,072,938 | Gillen | Sept. 9, 1913 |
| 1,179,539 | Mapel | Apr. 18, 1916 |
| 1,553,319 | Lardner | Sept. 15, 1925 |
| 1,834,111 | Rode | Dec. 1, 1931 |
| 2,035,711 | Lowndes | Mar. 31, 1936 |
| 2,124,811 | Bennett | July 26, 1938 |
| 2,237,377 | Thwaits | Apr. 8, 1941 |
| 2,238,401 | Shaw | Apr. 15, 1941 |
| 2,292,568 | Kanter | Aug. 11, 1942 |
| 2,297,090 | Weaver | Sept. 29, 1942 |
| 2,302,158 | Van Vulpen | Nov. 17, 1942 |
| 2,327,366 | Nampa | Aug. 24, 1943 |
| 2,358,999 | Ray | Sept. 26, 1944 |
| 2,415,099 | Hooper | Feb. 4, 1947 |
| 2,427,277 | Hasselbaum | Sept. 9, 1947 |
| 2,460,000 | Flanagan | Jan. 25, 1949 |